March 30, 1954 — G. E. BATCHELDER — 2,673,618
TWO-STAGE AIR ELIMINATOR
Filed Oct. 10, 1952 — 2 Sheets-Sheet 1
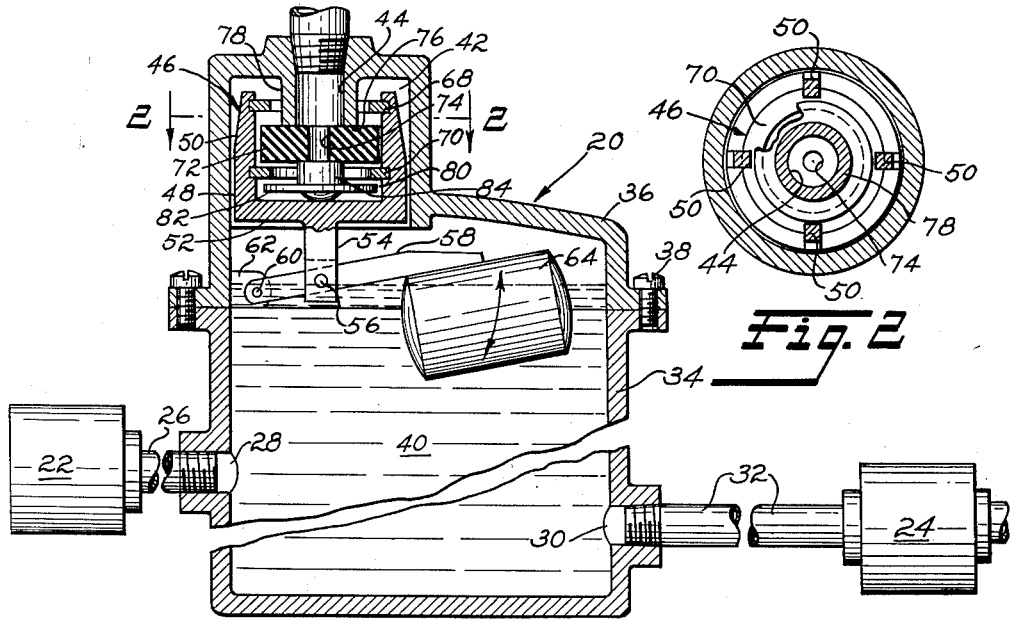
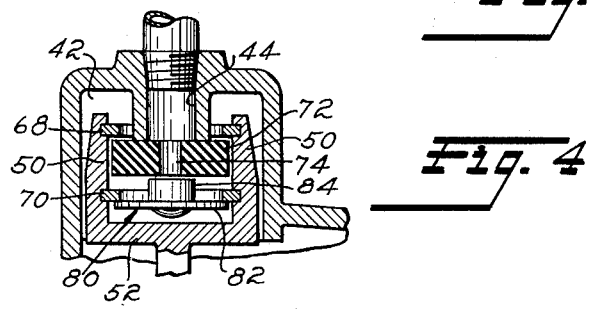
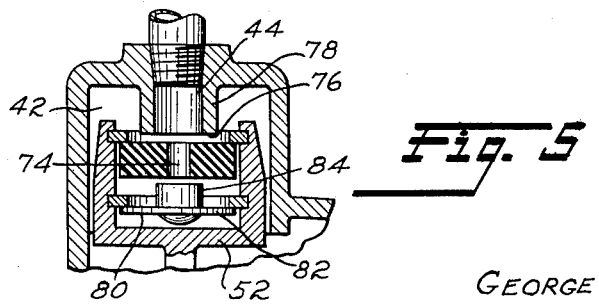
INVENTOR
GEORGE E. BATCHELDER
BY Strauch, Nolan & Diggins
ATTORNEYS March 30, 1954  G. E. BATCHELDER  2,673,618
TWO-STAGE AIR ELIMINATOR
Filed Oct. 10, 1952  2 Sheets-Sheet 2
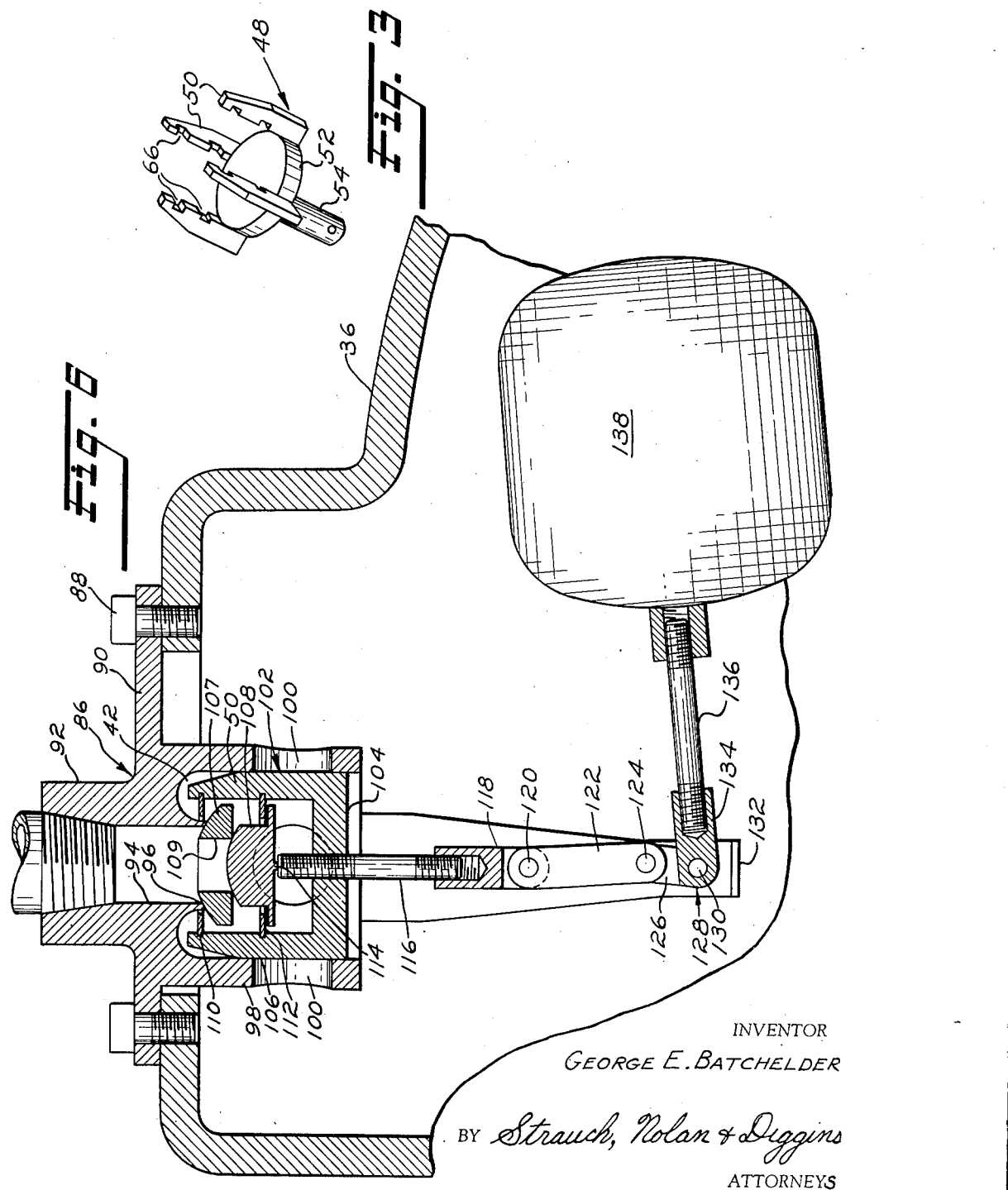
INVENTOR
GEORGE E. BATCHELDER
BY Strauch, Nolan & Diggins
ATTORNEYS Patented Mar. 30, 1954

2,673,618

UNITED STATES PATENT OFFICE 2,673,618

TWO-STAGE AIR ELIMINATOR

George E. Batchelder, Pittsburgh, Pa., assignor to Rockwell Manufacturing Company, Pittsburgh, Pa., a corporation of Pennsylvania Application October 10, 1952, Serial No. 314,131

17 Claims. (Cl. 183—2.5)

1

The present invention relates to air eliminators and, more specifically, to two-stage air eliminator valves having particular utility in connection with fluid metering systems, especially with those systems which include positive displacement type fluid meters.

In the field of dispensing metered amounts of liquid, a difficulty frequently arises which makes it impossible accurately to record the quantities of liquid dispensed. This difficulty is due to the fact that varying amounts of air or other gases inevitably become entrained in the liquids, whether the liquid is forced through the meter by a pump, by gravity, or by gas pressure. When the liquid, with the entrained gas, passes through a meter which records the volume of flow, the gas as well as the liquid is registered and the quantity of liquid dispensed is erroneously indicated. An additional difficulty arises when the source of liquid becomes exhausted. If the system comprises a pump, the pump forces air through the meter. If a pressurized reservoir system is used the pressurized gas from the empty reservoir is forced through the meter. In each case air is recorded as if it were liquid.

Air eliminators have been proposed hitherto to overcome the problem set out above, taking the form of a valve controlled by a float arranged in a separating chamber. The float, while buoyed up by the liquid in the chamber holds the valve in the closed position. If the liquid level recedes as when the liquid supply is exhausted or gas has accumulated above the liquid, the valve opens to allow the gas to escape. When the liquid returns to the normal level the float is raised and causes the valve to close.

Prior air eliminators are not satisfactory because of their inability to function adequately under many conditions which are encountered in normal or abnormal operation. Thus, if a small valve port and a small valve are employed in the air eliminator, operation is satisfactory when it is necessary to bleed small quantities of air accumulated above the liquid surface but such a valve lacks the capacity quickly to release the gas which is pumped to the separation chamber when the source of liquid becomes exhausted. On the other hand if a large valve is used, operation is satisfactory for conditions where the supply becomes exhausted but the valve and control mechanism are not sufficiently sensitive to small fluctuations in the liquid level to release small quantities of gas accumulated in the chamber.

Consequently it is an object of the present invention to provide novel air eliminators which

2 respond with equal speed and facility to all conditions encountered in operation.

It is a further object to provide an improved air eliminator having a novel two-stage valve.

It is a still further object to provide novel air eliminator valves which are of simple construction and comprise a minimum number of parts.

It is a further object to provide novel eliminator valves which give unusually long, trouble-free service and are particularly resistant to leakage.

It is a still further object to provide novel two-stage air eliminator valves in which each stage operates in response to a different predetermined condition in the metering system.

These and other objects of the invention will become apparent from a consideration of the following description to be read in conjunction with the subjoined claims and the annexed drawings in which:

Figure 1 is an elevational view of a liquid metering system comprising one form of the air eliminator of the present invention, which is shown in section;

Figure 2 is a sectional view of the valve assembly taken on line 2—2 of Figure 1;

Figure 3 is a perspective view of an element of the valve assembly;

Figure 4 is a view of the valve assembly as shown in Figure 1 with one stage of the valve in open position;

Figure 5 is a view similar to Figure 4 showing the valve assembly with both stages in the open position; and Figure 6 is a view of an air eliminator as shown in Figure 1 but with a modified form of valve assembly.

Referring to the drawings and particularly to Figure 1, numeral 20 designates generally the air eliminator of the present invention in a liquid metering system comprising a source of liquid, not shown, a pump 22 and a meter 24. The pump 22 draws liquid from the source and supplies it under pressure through inlet conduit 26 to inlet port 28 of the air eliminator 20, the liquid discharging through outlet 30 and outlet conduit 32 to a meter 24 which is ordinarily of the positive displacement type, whence it passes to a delivery conduit, not shown.

The air eliminator 20 is composed of a hollow housing 34 and a cover 36 fastened to the housing as by bolts 38 to form a float or separation chamber 40. The cover 36 includes a substantially cylindrical valve chamber 42 having an air bleed port 44 in the upper wall thereof. Chamber 42 accommodates a major portion of the valve assembly, indicated generally by numeral 46, which controls port 44.

Valve assembly 46 includes a valve cage 48, best shown in Figure 3, which is composed of a plurality (four are shown) of fingers 50 attached to the periphery of a disk 52. Depending from the disk 52 is a stem 54 which is pivotally connected as by pin 56 to an operating lever arm 58 (Fig. 1) which in turn is swingably mounted as by pin 60 to a boss 62 on the inside of cover 36.

The opposite end of lever arm 58 carries a float 64 which is adapted to be buoyed up by the liquid in chamber 40 thereby regulating the angular position of the lever 58 in response to the level of said liquid. In the embodiment of Fig. 1, the float 64 is shown as being fixedly attached to lever 58 but it will be appreciated that the float may be adjustably attached to the lever, for example, as shown in the modification illustrated by Fig. 6 and hereinafter to be described.

The fingers 50 each carry a pair of vertically spaced notches 66 adapted to receive upper and lower abutment rings 68 and 70, respectively, which may be of the type commonly known as split or snap-rings.

Freely received between the upper and lower abutment rings is an upper or second stage valve element 72 in the form of a circular disk with a central aperture 74. The valve element is constructed preferably of a resilient material and is adapted to seat on an annular valve seat 76 provided on the lower end of the cylindrical boss 78 formed on cover 36.

A lower or first stage valve element 80, comprising a circular disk 82 having a thickened central portion 84 extending above and below its surfaces is located between the lower abutment ring 70 and bottom disk 52. The upper part of the thickened central portion 84 is adapted to seat on and close the central aperture 74 of the upper valve element 72.

As shown in the drawings, particularly Figs. 1, 4 and 5, spacing of the abutment rings 68 and 70 and the disc 52 relative to each other and the surfaces of the elements 72 and 80 such that, with the valves in their normal, closed position and cage in its normal uppermost position (Fig. 1), there is a greater clearance between the upper ring 68 and top surface of the upper valve element 72 than there is between the lower ring 70 and the top surface of the lower valve element 80.

The purpose of this construction is so that, upon downward displacement of the valve cage, the lower abutment will contact the first stage valve element substantially prior to contact between the upper abutment and the second stage valve element, as will more fully appear from the following description of the operation of the device.

Assuming that the liquid dispensing system is operating under ideal conditions with an ample source of supply and no gas entrained in the liquid, the chamber 40 will be substantially full and float 64, in accordance with a preselected buoyancy, will bias operating arm 58 in a counter-clockwise direction. This in turn forces the valve cage 48 upwardly to its normal position in which the disk 52 contacts the lower side of the thickened portion 84 of lower valve element 80 and forces it upwardly into contact with the upper valve element which in turn is moved against the annular valve seat 76 to close entirely the air bleed port 44 as shown in Figure 1.

The closing force exerted by the disc 52 is augmented by the fluid pressure in chamber 40 which acts on the upper and lower valve elements, the resultant of the fluid pressure being an upward force biasing both said elements toward closed position. Thus, once closed, each valve element will remain seated until positively moved from its seat.

If a quantity of gas becomes entrained in the liquid passing through the air eliminator, for example, in the form of tiny air bubbles, this air will separate out of the liquid in the float chamber and rise to the surface, thereby progressively lowering the liquid level in the flow chamber. In response to this recession of the liquid level, the float assumes a slightly lower position carrying with it arm 58, disk 52 and valve cage 48, thereby relieving the upward pressure of disc 52 on lower valve element 80. At this point, both upper and lower valve elements are held in closed position solely by means of the fluid pressure acting thereon.

When the liquid level has dropped from normal by a preselected amount, the valve cage is accordingly lowered to the extent that the lower abutment ring 70 contacts the upper surface of the lower valve element 80. The continued downward movement of float 64 resulting from the progressive accumulation of air above the liquid surface causes sufficient force to be applied to the lower valve element to overcome the closing pressure of the fluid and move it from its seat thereby uncovering aperture 74 in the upper valve element and placing chamber 40 in communication with the atmosphere through port 44 as shown in Figure 4.

As soon as the aperture 74 is opened, the air accumulated above the liquid surface will bleed off around disc 52, between fingers 50, and will escape to the atmosphere, allowing the liquid level to rise and return the float to normal position, closing the lower valve.

It will be noted that the foregoing operation takes place in a very short space of time and that, in this phase of operation, the lower or first stage valve being very sensitive to the liquid level, opens quickly and easily, preventing a large accumulation of air and closes just as quickly and easily to prevent the escape of liquid through the air bleed.

It will also be noted that the downward travel of cage 46 which positively opens the first stage valve 80 is insufficient to cause the upper abutment ring 68 to contact and open the second stage valve element 72.

Now, assuming that the source of supply becomes exhausted, the liquid level in float chamber 40 will drop more quickly to a very low level, carrying with it float 64. During the first instant, the first stage of the air bleed valve 80 will be opened as described above but, under these conditions the capacity of the first stage is insufficient to bleed off air at the rate at which it enters chamber 40 from the source of supply. Consequently, the liquid level continues to fall until the upper abutment 68 contacts and opens the second stage valve element 72 as shown in Figure 5 thereby providing sufficient flow area to accommodate all of the air entering the chamber. The port 44 is of sufficient size as to offer less resistance to air flow than meter 24 so that the air, following the path of least resistance, flows through port 44 rather than through the meter.

The actual areas of port 44 and aperture 74 and the ratio of these areas obviously bear on the sensitivity and capacity of the air eliminator valve assembly and may be selected and varied in accordance with anticipated service conditions. The relative spacing of the valve elements, abutment rings and disc 52 likewise bear on the sensitivity of the device and may be prudently selected to achieve satisfactory results in accordance with the operating conditions to be encountered or may be made adjustable as in the modification now to be described.

Figure 6 shows an air eliminator embodying a modified air bleed valve assembly, with like reference numerals denoting like parts. In this modification, the valve chamber 42 is formed in a housing element 86 separable from cover 36 and attached thereto as by bolts 88 passing through a flange 90. The element 86 comprises an upstanding boss 92 having a bore 94 therein. The lower edge of the boss surrounding bore 94 constitutes an annular valve seat 96.

The housing element 86 also comprises a depending cylindrical guide 98 having a plurality of ports 100 therein. Slidably received within guide 98 is a valve cage 102 having a disc 104 and fingers 106 similar to those described in the embodiment of Fig. 1. The exterior surfaces of fingers 50 slide on and are guided by the interior surface of the cylindrical guide 98. As in the first embodiment, upper and lower valve elements 107 and 108, are positioned adjacent upper and lower abutment rings 110 and 112 respectively. The valve elements also are generally similar to those of Fig. 1, the upper or second stage valve 107 preferably being constructed of resilient material, except that conical or tapered rather than flat seating surfaces are employed. Valve member 107 is provided with an aperture 109 of suitable size.

The lower or first stage valve element 108 is provided with a small projection 114 on its under surface, which projection supports the valve on the upper end of stem 116 which is adjustably threaded through the disc 104. The stem 116 is threaded to a link 118 which is pivotally connected, for example, by pin 120 to a second link 122 which, in turn is pivotally joined as by pin 124 to one arm 126 of a bell crank 128. The bell crank is pivotally mounted, for example, by pin 130 to the lower end of a stationary bracket 132 which depends from the cylindrical guide 98. The other arm 134 of the bell crank threadedly receives a lever rod 136 on which is threadedly mounted a float 138.

In operation, the float responds to the level of liquid in the float chamber 40, rocking bell crank 128 about its pivot, Assuming that the liquid level drops, the bell crank will be rocked in a clockwise direction and a downward pull exerted on the remainder of the linkage and the valve assembly. When the float rises the action of the linkage is reversed. Except for the actuating linkage, the remainder of the operation of the air eliminator is the same as described in conjunction with the embodiment of Fig. 1.

It will be noted, however, that in this modification, a number of adjustments are provided. Thus, the opening and closing force exerted by float 138 and the ratio of the vertical displacement of the valve cage in proportion to a given change in liquid level chamber 40 (i. e. the sensitivity) can be varied by adjusting the effective length of lever arm 136. Likewise, the amount of lost motion between valve cage 102 and the valve elements 106 and 108 can be changed by adjusting the threaded connection between the cage and stem 116.

The valve elements in both embodiments may be made of any suitable material. It has been found, however, that excellent results are obtained when the upper valve element is constructed of a resilient material sufficiently rigid to resist undue deformation under the fluid pressures encountered. Such resilient material is particularly resistant to the effects of the abrasives likely to be present in the metered liquids and the specific valve construction is such as to facilitate the washing away of any foreign material caught between the valve elements and their respective seating surfaces.

The invention may be embodied in other specific forms without departing from the spirit or essential characteristics thereof. The present embodiment is therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed and desired to be secured by United States Letters Patent is:

1. In a gas eliminator, means defining a chamber normally containing a body of liquid and having an inlet and outlet therefor, a bleed port for permitting the release of gas from the top of said chamber, a two-stage valve for selectively opening and closing said bleed port comprising a first valve element adapted, in closed position, to partially close said bleed port, a second valve element adapted, in closed position, to complete closure of said port and urge said first valve element toward closed position, and a valve cage assembly containing said valve elements and adapted sequentially to move said second and first valve elements to open position in response to a predetermined lowering of the liquid level in said chamber.

2. A gas eliminator as defined in claim 1 wherein said first valve element is an annulus of resilient material circumscribing a central aperture of less area than said bleed port and said second valve element comprises a disc having a thickened central portion adapted to close said aperture.

3. A gas eliminator as defined in claim 2 wherein said valve elements have tapered seating surfaces.

4. In a gas eliminator, a chamber adapted to contain a body of liquid under super-atmospheric pressure normally filling said chamber to a preselected level, inlet and outlet means for said liquid, a bleed port for permitting the escape of gases from said chamber, a two-stage valve for said bleed port comprising a first normally-closed valve element adapted, in its closed position, to partially close said bleed port, a second normally closed valve element adapted in its closed position to complete closure of said port, a valve cage loosely supporting said valve elements and being movable toward and away from said port, means for moving said cage away from said port in response to a lowering of said liquid level and means on said cage adapted during said movement away from the port for first moving said second valve element to partially open said port and then moving said first element to completely open said port.

5. A gas eliminator as defined in claim 4 wherein said means for moving said cage comprises a float of preselected buoyancy; a lever arm carrying said float and pivotally linked to said valve cage, the effective length of said lever arm being adjustable whereby the ratio of the distances traveled by said float and said valve cage may be varied.

6. A gas eliminator having a chamber adapted to contain a body of liquid under super-atmospheric pressure normally filling said chamber to a preselected level; inlet and outlet means for said liquid; a bleed port for permitting the escape of gases from the top of said chamber; and two-stage valve means responsive to variations in the level of said liquid for selectively opening and closing said port comprising an upper, annular, normally-closed valve element having a central aperture of less area than said port and adapted to seat thereover; a lower, normally-closed valve element adapted to seal said aperture in said upper valve element; a valve cage having a closed bottom and a plurality of upstanding fingers in surrounding relation to said upper and lower valve elements; means for downwardly displacing said valve cage in response to a lowering of said preselected liquid level; means projecting inwardly from said fingers at a preselected distance above said upper valve element, said means being adapted to engage and displace said upper valve element upon downward displacement of said valve cage; additional means projecting inwardly from said fingers below said upper valve element and at a preselected distance above said lower valve element, said additional means being adapted to engage and displace said lower valve element upon downward displacement of said valve cage, said second mentioned preselected distance being less than said first preselected distance so that said lower valve element will be engaged and displaced before said upper valve element.

7. A gas eliminator as defined in claim 6 wherein said valve cage fingers have a plurality of notches and said inwardly projecting means comprise snap rings disposed in said notches.

8. A gas eliminator as defined in claim 7 wherein said upper valve element comprises a resilient disc disposed between said snap rings and having a central aperture of lesser area than said bleed port and said lower valve element comprises a disc having a thickened central portion of sufficient area to seal said aperture, said disc being disposed beneath the lower of said snap rings.

9. A device of the character described comprising means defining a chamber normally containing a body of liquid under pressure at a preselected level, inlet and outlet means for said liquid, a bleed port for permitting the escape of gas trapped above the surface of said liquid, an annular valve element having an aperture of smaller area than said port and being normally seated over said bleed port, a substantially discoid valve element normally abutting said annular valve element to maintain it in closed position and seal said aperture, a valve cage mounted for substantially linear displacement toward and away from said port, means for scheduling the position of said valve cage as a direct function of said liquid level, said valve cage surrounding said valve elements and adapted in a preselected normal position, to maintain said discoid valve element in normal abutting relation with said annular valve element, said valve cage including a first abutment ring, a second abutment ring and a bottom closure, said annular valve element being disposed between said first and second abutment rings, said discoid valve element being disposed between said second abutment ring and said bottom closure, said abutment rings being so disposed that, with said valve cage in said normal position, said first abutment ring is spaced from said annular valve element by a preselected amount and said second abutment ring is spaced from said discoid valve element, by a lesser preselected amount, whereby, during a first increment of displacement of said valve cage from said one position said discoid element is contacted by said lower retainer ring and moved to open position and upon further downward positioning of said valve cage, said annular valve element is moved to open position.

10. In a gas eliminator, an enclosed chamber normally filled to a preselected level with liquid under super-atmospheric pressure; inlet and outlet means therefor; a bleed port in the top wall of said chamber for permitting the release of gases accumulating above said liquid level; an annular perforated guide means around said port depending from said top wall; a valve cage slidably received in said guide means and comprising a bottom disc carrying a plurality of upstanding fingers secured to the periphery thereof; a stem projecting through said bottom disc; a pair of vertically spaced abutment rings secured to said fingers; an annular valve element disposed within said valve cage between said rings; a second valve element disposed within said valve cage between the lower of said rings and said stem; said abutment rings being so disposed that, with said valve cage in a preselected normal position said valve elements occupy a port closing position, with the upper of said abutment rings spaced from said annular valve element by a preselected amount and said lower abutment ring spaced from said second valve element by a lesser preselected amount, a liquid level responsive float in said chamber, a linkage operatively connecting said stem with said float whereby the vertical position of said valve cage is raised or lowered in response to the height of said liquid.

11. A gas eliminator as defined in claim 10 wherein said stem is adjustably threaded through said bottom disc thereby permitting adjustment of the relative positions of said valve elements.

12. A gas eliminator as defined in claim 10 wherein said operative linkage comprises a link having one end pivotally adjustably secured to said stem, a bell-crank pivotally mounted within said chamber and having one arm pivotally attached to the other end of said link, and a rod carrying said float at one end and having its other end secured to the arm of said bell crank.

13. A gas eliminator for liquid metering systems comprising, in combination, a closed chamber adapted to contain a transient body of said liquid filling said chamber to a preselected normal level, inlet and outlet means in the side walls of said chamber for accommodating flow of said liquid therethrough, a bleed port in the top wall of said chamber for permitting the escape of gases from said chamber; a valve cage mounted for substantially linear displacement toward and away from said bleed port, means operatively connected to said valve cage for displacing said valve cage away from said bleed port in response to a recession of said liquid from said normal level, a pair of normally-seated valve elements disposed and retained within said valve cage and jointly serving to close said bleed port, and a pair of abutment rings disposed within said valve cage and so arranged as to move one of said valve elements to open position upon slight movement of said valve cage away from said port and to move the other of said valve elements to open position upon further displacement of said valve cage.

14. A gas eliminator for liquid metering systems comprising in combination, a closed chamber adapted to contain a transient body of said liquid filling said chamber to a preselected normal level, liquid inlet and outlet means in the side walls of said chamber, a bleed port in the upper wall of said chamber for permitting the escape of gases from said chamber, a valve cage in a preselected normal position while said liquid is at said normal level, means for moving said valve cage away from and toward said port respectively in response to a lowering and raising of said liquid level, a first valve element disposed within said valve cage and adapted normally to partially close said port, a second valve element disposed within said cage and adapted normally to completely close said port and means located within said valve cage for sequentially engaging and moving said second and first valve elements from closed to open position in response to said linear displacement of said valve cage away from said port.

15. In a gas eliminator, a chamber having inlet and outlet ports and adapted to contain a transient body of liquid under pressure at a predetermined normal level and means for bleeding off gas accumulating in said chamber above the surface of said liquid comprising a bleed port, an apertured valve element adapted to seat over and partially occlude said bleed port, a second valve element adapted to seat on said annular valve element and close the aperture therein, said valve elements being normally maintained in seated position by the pressure of gases in said chamber, a valve cage mounted within said chamber for substantially linear coaxial movement relative to said bleed port, means operative in response to a rise and fall of the level of liquid in said chamber to move said valve elements respectively toward and away from said bleed port, said valve cage comprising spaced abutment means operative in response to a drop in the level of liquid in said chamber below said predetermined normal level to unseat said second and then said first valve element in succession against the pressure of said gases and operative in response to restoration of the liquid level to said predetermined normal level to jointly re-seat said valve elements.

16. In a gas eliminator, means defining a chamber adapted to contain a transient body of liquid under superatmospheric pressure normally filling said chamber to a preselected level, inlet and outlet means for said liquid, a bleed port for permitting escape of gases from said chamber, a two-stage valve assembly for controlling said bleed port comprising a lever arm in said chamber having one end pivotally secured to said chamber defining means, a float of preselected buoyancy secured to the other end of said lever arm to position said arm in response to variations in the level of liquid in said chamber, a valve cage pivotally connected to said lever arm intermediate the ends thereof, a first valve element disposed within said valve cage and adapted, in its normally closed position, to partially close said bleed port, a second valve element disposed within said valve cage and adapted in its normally closed position, to complete closure of said bleed port, said valve elements being normally maintained in closed position by the pressure of gases in said chamber, means on said valve cage for sequentially opening said second and then said first valve element in response to a lowering of the level of said liquid below said preselected level and for jointly closing said valve elements when said liquid rises to said preselected level.

17. In a gas eliminator, means defining a chamber adapted to contain a transient body of liquid under superatmospheric pressure normally filling said chamber to a preselected level, inlet and outlet means for said liquid, a bleed port for permitting escape of gases from said chamber, a two-stage valve assembly for controlling said bleed port comprising an annular valve element having a central aperture of lesser area than said bleed port and adapted to seat over and partially occlude said bleed port, a second valve element adapted to seat on said first valve element and close said aperture therein, said valve elements being normally maintained in seated position by the pressure of gases in said chamber, a valve cage mounted within said chamber for movement toward and away from said bleed port, means for moving said valve cage away from said bleed port in response to a drop in liquid level and toward said valve port in response to a rise in liquid level in said chamber, said valve cage comprising means operative upon a drop in the level of said liquid below said preselected level for sequentially unseating said second and then said first valve element against the pressure of gases in said chamber and operative upon movement of said valve cage toward said bleed port to jointly re-seat said valve elements when the level of said liquid rises to said preselected level.

GEORGE E. BATCHELDER.

References Cited in the file of this patent
UNITED STATES PATENTS

| Number | Name | Date |
|---|---|---|
| 214,719 | Sherbondy | Apr. 22, 1879 |
| 1,142,513 | Gase | Apr. 22, 1879 |
| 1,856,105 | Marden | May 3, 1932 |
| 2,217,655 | Bassett | Oct. 15, 1940 |